A hermetic coupling device between an optoelectronic component emitting and/or receiving a light beam, and an optical transmission mechanism conveying the light beam. The hermetic coupling device includes a substrate including a blind hole, having a bottom wall, into which one part of the optical transmission mechanism is inserted. The substrate is formed of a stack of a first layer and a second layer. The light beam crosses the substrate passing through the bottom wall of the blind hole, the substrate receiving the optoelectronic component substantially opposite the blind hole. Reflective patterns are inserted between two layers of the hermetic coupling device, substantially on the periphery of the blind hole, and reflect one part of the light beam emitted by the optoelectronic component.

United States Patent
Kopp et al.

(10) Patent No.: US 7,476,041 B2
(45) Date of Patent: Jan. 13, 2009

(54) HERMETICALLY COUPLING DEVICE

(75) Inventors: Christophe Kopp, Fontanil-Cornillon (FR); Stephane Bernabe, Voiron (FR)

(73) Assignees: Commissariat a l'Energie Atomique, Paris (FR); Intexys, Labege (FR)

( * ) Notice: Subject to any disclaimer, the term of this patent is extended or adjusted under 35 U.S.C. 154(b) by 0 days.

(21) Appl. No.: 12/065,151

(22) PCT Filed: Aug. 29, 2006

(86) PCT No.: PCT/EP2006/065780
§ 371 (c)(1),
(2), (4) Date: Feb. 28, 2008

(87) PCT Pub. No.: WO2007/025969
PCT Pub. Date: Mar. 8, 2007

(65) Prior Publication Data
US 2008/0193142 A1  Aug. 14, 2008

(30) Foreign Application Priority Data
Sep. 2, 2005 (FR) .................................. 05 52666

(51) Int. Cl.
*G02B 6/36* (2006.01)
(52) U.S. Cl. ........................................ 385/94; 385/139
(58) Field of Classification Search .................. 385/94, 385/139
See application file for complete search history.

(56) References Cited

U.S. PATENT DOCUMENTS

| 4,826,272 | A | 5/1989 | Pimpinella |
| 4,836,633 | A | 6/1989 | Morgan et al. |
| 5,790,730 | A * | 8/1998 | Kravitz et al. ................. 385/49 |
| 7,232,263 | B2 * | 6/2007 | Sashinaka et al. ............ 385/88 |
| 2002/0054737 | A1 * | 5/2002 | Jian ............................ 385/49 |
| 2002/0071636 | A1 * | 6/2002 | Bazylenko et al. ........... 385/49 |
| 2003/0098511 | A1 | 5/2003 | Moon et al. |
| 2004/0033029 | A1 * | 2/2004 | Kondo ........................ 385/88 |
| 2007/0137254 | A1 * | 6/2007 | Fukuzawa et al. ............ 65/386 |

FOREIGN PATENT DOCUMENTS

EP      0975072      1/2000
WO   WO-03/058781   7/2003

OTHER PUBLICATIONS

Johan Holm et al.: "Through-Etched Silicon Carriers for Passive Alignment of Optical Fibers to Surface-Active Optoelectronic Components", Sensors and Actuators 82 (2000), pp. 245-248.

* cited by examiner

*Primary Examiner*—Ellen Kim
(74) *Attorney, Agent, or Firm*—Oblon, Spivak, McClelland, Maier & Neustadt, P.C.

(57) ABSTRACT

25 Claims, 9 Drawing Sheets

HERMETICALLY COUPLING DEVICE

TECHNICAL AREA

The present invention concerns the field of telecommunications, and more particularly the field of components located at optical/electrical interfaces of telecommunication networks, such as a hermetic coupling device, an optoelectronic emitting and/or receiving device and system, and a method for their fabrication. These devices are especially suitable for coupling between an optical transmission means and one or more optoelectronic emitting and/or receiving components.

STATE OF THE PRIOR ART

In an optical network, components located at optical/electrical interfaces, commonly called <<transceivers>>, act as emitter and/or as receiver and conduct the conversion of optical signals into electrical signals, and conversely. The optical transmission means generally used with a transceiver is an optical fiber. The receiving component used in a transceiver is generally a photodetector of photodiode type. The emitting component used in a transceiver is generally one of the two following types: EEL (Edge Emitting Laser) or VCSEL (Vertical Cavity Surface Emitting Laser). FIG. 1 shows a VCSEL 1 which emits a laser beam 2 via a face 3.

An EEL emits a beam of substantially elliptical shape, particularly unsuitable for strong coupling with an optical fiber. The solutions considered to improve this coupling, such as mode adaptation at an optical guide or through the use of an optical coupling system, give rise to complex architecture and to difficulties for the necessary alignment between the EEL and the optical fiber, by increasing the sensitivity of the device to positioning errors.

In a transceiver, a VCSEL and/or a photodiode are generally hybridized on a platform typically comprising a network of electric interconnects. By <<hybridized>>, here and in the remainder of the document, is meant a connection that is both mechanical and electrical. This platform may for example be made in silicon, ceramic may be a printed circuit. The solution for coupling an optical fiber with an optoelectronic component generally consists of piercing the platform to bring the optical fiber close to the optoelectronic component, and of aligning the optical axis of the fiber with the optical axis of the optoelectronic component passively i.e. aligning mechanically without recourse to a laser beam emitted or received by the component.

Patent application US 2003/0098511 proposes a coupling device 6, shown FIG. 2, in which an optical fiber 7 is inserted in a hole 8 whose diameter is slightly greater than the diameter of the optical fiber 7, this hole fully passing through a platform 9. An optoelectronic component 5, in this case a VCSEL emitting a laser beam 2 in the optical fiber 7, is hybridized and precisely aligned on the platform 9, above the hole 8, using hybridization techniques with solder balls (microspheres) 4 of fusible alloys. This hybridization technique using microspheres, commonly called the <<flip-chip>> method, can achieve alignment of the component 5 with the optical fiber 7 to an accuracy in the order of one micrometer.

U.S. Pat. No. 4,826,272 presents the assembling of an optical fiber 10 perpendicular to an optoelectronic component 11 secured to a substrate 12. This assembly is shown FIG. 3. One end of the optical fiber 10 lies in abutment in a through V-groove 13 opening with square section. This hole 13 is used to align the fiber 10 passively and to determine the distance between the end of the fiber 10 and the component 11. With this technique it is possible to achieve good precision of coupling, typically to within less than 2 micrometers.

As a general rule, the components present on a transceiver must withstand difficult environmental conditions for periods of at least 20 years, which implies the use of solutions to insulate these components, generally in the form of bare chips, against environmental aggression (temperature, moisture, etc.). These constraints are defined in various norms or standards such as the documents <<Telcordia GR-468-CORE>> or <<MIL-STD-883>>.

The chief protection method consists of using a hermetic cap to cover these components. This hermetic cap can partly protect the components against the outside environment. To complete this protection and guarantee a full hermetic seal around these components, the aperture in the platform through which the optical fiber is inserted is made hermetic i.e. the hole 8 in FIG. 2 and hole 13 in FIG. 3.

In FIG. 3, it can be seen that the optical fiber 10 is secured in the hole 13 by gluing means 14, in this case an organic glue. This glue, which fully fulfils its role to secure the fiber 10, does not allow the hole 13 to be made hermetic. The permeability of these organic glues to water vapor is far too high.

Several methods exist for the hermetic sealing of an aperture into which an optical fiber is to be inserted.

First, the fiber can be metallized then brazed in a hole provided in the platform. But metallizing an optical fiber is expensive and may weaken the fiber, in particular on account of the mechanical stresses it undergoes when the metal deposit is cooled. The brazing step may also lay stress on and weaken the fiber due to the temperature rise required for brazing, typically to over 200° C. Finally, the brazing step may also weaken the formed braze joint subsequent to mechanical stresses it may undergo on cooling.

Fusible glass may also be used for hermetic sealing of a hole in which an optical fiber is to be inserted, as is illustrated FIG. 4. In this figure, an optical fiber 15 is inserted in a ferrule 16, the hermeticity between the fiber 15 and the ferrule 16 being obtained with fusible glass 17. But here again the use of glass 17 may stress and weaken the fiber due to the required temperature rise to re-melt this fusible glass 17, typically to over 300° C.

Finally an optical fiber can be crimped into a hole intended to receive it. In this third method a crimping bushing is placed over the fiber-hole junction. But force crimping, owing to the adaptation of coefficients of thermal expansion between the fiber, the crimping bushing and the hole can stress and weaken the fiber.

Aside from the mechanical aspects, the problems of stresses on an optical fiber may also be optically detrimental for a polarization-maintaining optical fiber for example. In this case, any stress will deteriorate polarization-maintaining performance by increased coupling between the polarization states.

Additionally, the high temperatures applied to secure the optical fiber may not be tolerated by the optoelectronic or electronic components present on the platform.

DESCRIPTION OF THE INVENTION

The purpose of the present invention is to propose a hermetic coupling device which uses the passive alignment techniques of the prior art, between an optical transmission means and one or more optoelectronic components. The device of the present invention can, at low cost, guarantee the hermeticity of a guide hole for the optical transmission means, whilst avoiding the mechanical and thermal stresses to which the optical transmission means is subjected in prior art devices.

To achieve these purposes, the present invention proposes a hermetic coupling device between at least one optoelectronic component, which is to emit and/or receive at least one light beam, and an optical transmission means which is to convey the light beam. The hermetic coupling device comprises a substrate provided with at least one blind hole, having a bottom wall, into which part of the optical transmission means is to be inserted, the light beam having to cross through the substrate by passing through the bottom wall of the blind hole, and the substrate intended to receive the optoelectronic component substantially opposite the blind hole.

Therefore, instead of using one of the prior art methods for hermetic sealing of the through-aperture for the optical transmission means in a non-hermetic coupling device, a coupling device is provided which allows passive aligning of the optoelectronic component with the optical transmission means, and which also guarantees the hermeticity of the through-aperture between the optoelectronic component and the optical transmission means.

This device also allows the optical transmission means to overcome the mechanical and thermal stresses to which it was subjected in prior art methods.

The substrate may be in a semiconductor-based material such as silicon.

The hermetic coupling device may comprise a photodetection system integrated on a semiconductor surface of the substrate, arranged substantially opposite the blind hole.

The photodetection system, for example, may be at least one photodetector of MSM type.

The substrate may be formed of a stack of at least one first layer, and at least one second layer intended to be arranged between the first layer and the optoelectronic component, the blind hole passing through the entirety of the first layer, and the second layer forming the bottom wall of the blind hole of the substrate.

The blind hole may partly pass through the second layer.

It can be considered that the second layer is in a semiconductor-based material, such as silicon, or glass- or silica-based.

The second layer can be formed of a stack of at least two sub-layers.

The hermetic coupling device may comprise reflective patterns inserted between two layers of the hermetic coupling device, arranged substantially on the periphery of the blind hole and intended to reflect part of the light beam emitted by the optoelectronic component.

The hermetic coupling device may comprise at least one third layer through which at least one hole fully passes that is aligned with respect to the blind hole, the second layer being arranged between the first layer and the third layer.

The third layer may be in a semiconductor material such as silicon.

The present invention also concerns an optoelectronic emitting and/or receiving device comprising at least one optoelectronic emitting and/or receiving component, and a hermetic coupling device as characterized, the optoelectronic component being joined to the hermetic coupling device and arranged substantially opposite the blind hole of the hermetic coupling device.

The optoelectronic component may be a laser emitter such as a VCSEL, or a photodetector such as a photodiode.

The optoelectronic emitting and/or receiving device, in addition to the optoelectronic component called the first optoelectronic component, may comprise at least one second optoelectronic component joined to the hermetic coupling device and arranged substantially opposite the blind hole, the first optoelectronic component being arranged between the hermetic coupling device and the second optoelectronic component.

If the first optoelectronic component is a laser emitter, the second optoelectronic component can be a photodetector such as a photodiode, and if the first optoelectronic component is a photodetector, the second optoelectronic component can be a laser emitter e.g. a VCSEL.

The first optoelectronic component may be transparent or near-transparent to at least one light beam emitted and/or received by the second optoelectronic component, said light beam having to pass through the first optoelectronic component and the hermetic coupling device by passing through the bottom wall of the blind hole, and being conveyed by the optical transmission means.

The second optoelectronic component can be secured to the hermetic coupling device directly or via the first optoelectronic component.

Preferably, the securing of the optoelectronic component(s) onto the hermetic coupling device is made using a microsphere connection.

In this case, the microspheres can be in a fusible material such as a gold- and tin-based alloy, tin- and lead-based alloy, or a pure or nearly pure tin- or indium-based metal.

The optoelectronic emitting and/or receiving device may comprise a hermetic cap over the optoelectronic component(s) and joined to the hermetic coupling device.

The present invention also concerns an optoelectronic emitting and/or receiving system comprising at least one optical transmission means and an optoelectronic emitting and/or receiving device thus characterized, the optical transmission means having a part inserted in the blind hole of the hermetic coupling device of the optoelectronic emitting and/or receiving device.

The optical transmission means may be an optical fibre.

The optical fiber can be secured to the optoelectronic emitting and/or receiving device by a bead of glue.

In another variant, the optical transmission means may be a lens, which is to be passively aligned with an optical fiber inserted in a connector, one part called a first part of the lens being inserted in the blind hole of the hermetic coupling device of the optoelectronic emitting and/or receiving device, and a second part of the lens to be inserted in a housing of the connector, facing the optical fiber.

The lens can be of substantially spherical shape.

The optical fiber may be a polarization-maintaining optical fiber.

BRIEF DESCRIPTION OF THE DRAWINGS

The present invention will be better understood on reading the description of examples of embodiments given solely for indication purposes, and in no way limiting, with reference to the appended drawings in which.

Identical, similar or equivalent parts in the different figures described below carry the same reference numbers to facilitate cross-reading of the figures.

The different parts shown in the figures are not necessarily drawn to uniform scale, for better legibility of the figures.

The different possibilities (variants and embodiments) are not to be construed as being exclusive of each other and may be combined together.

DETAILED DESCRIPTION OF PARTICULAR EMBODIMENTS

Figure 1:
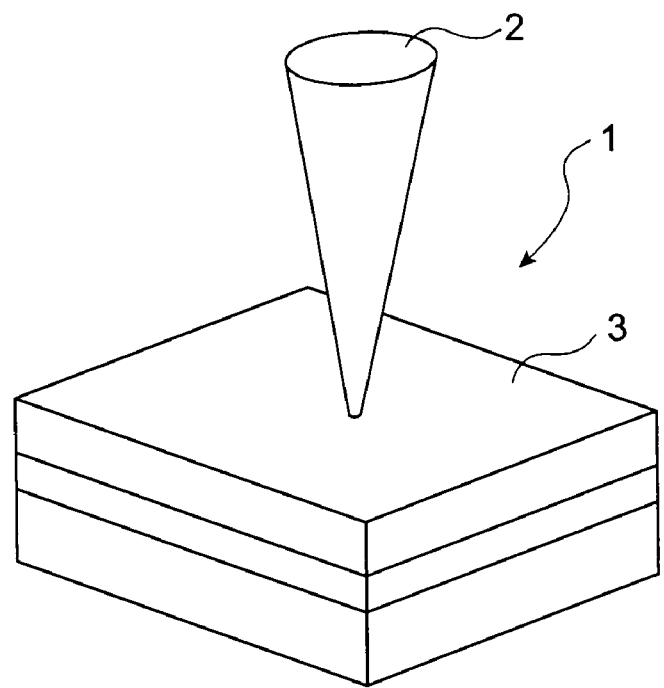
FIG. 1, already described, shows an exemplary VCSEL of the prior art.
Figure 2:
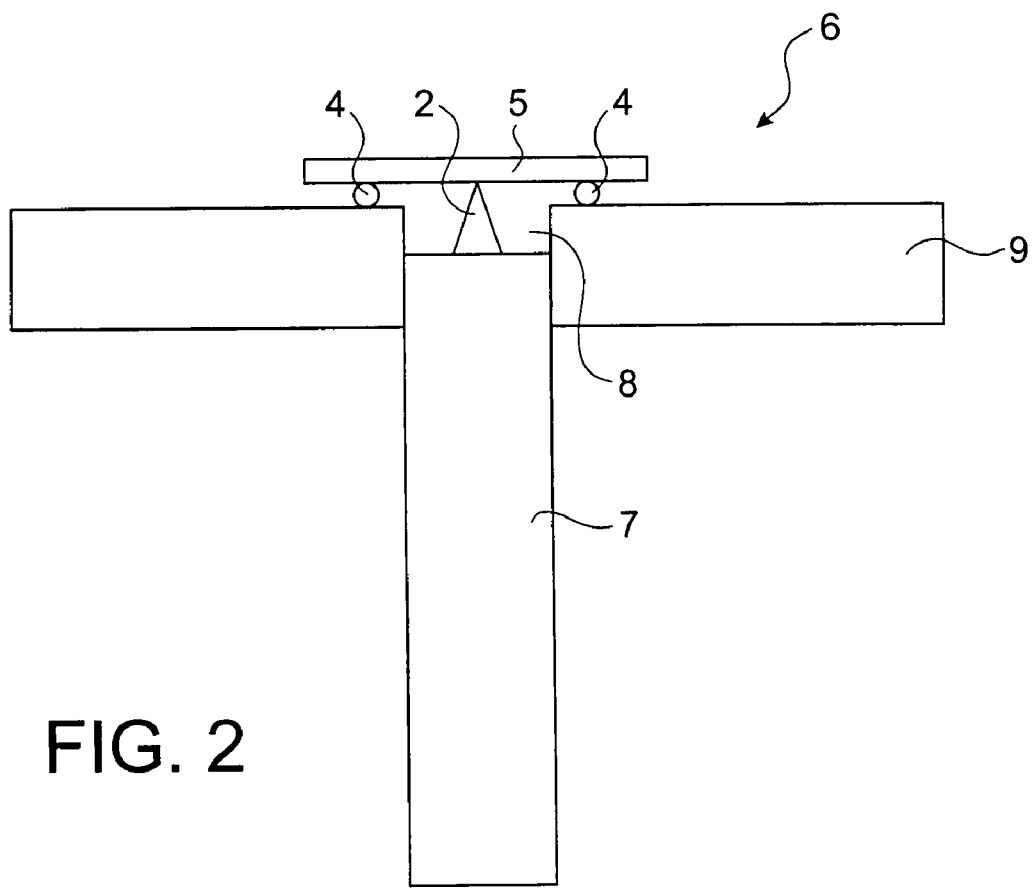
FIG. 2, already described, shows an exemplary coupling device of the prior art.
Figure 3:
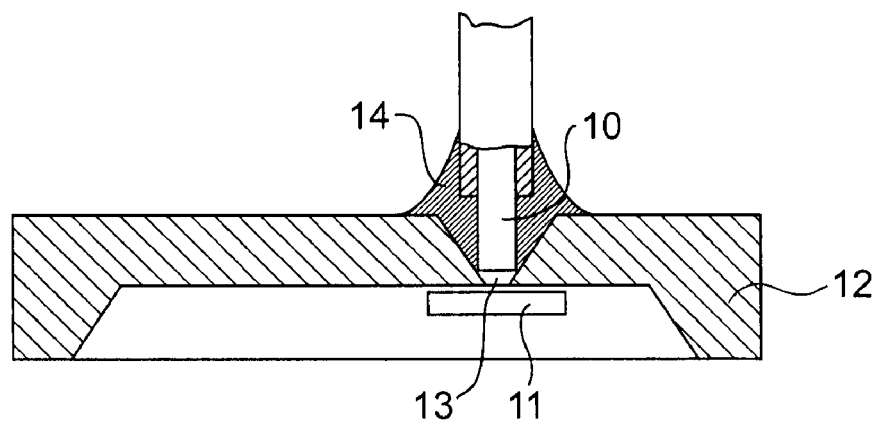
FIG. 3, already described, shows an assembly structure of an optical fiber and a component of the prior art.
Figure 4:
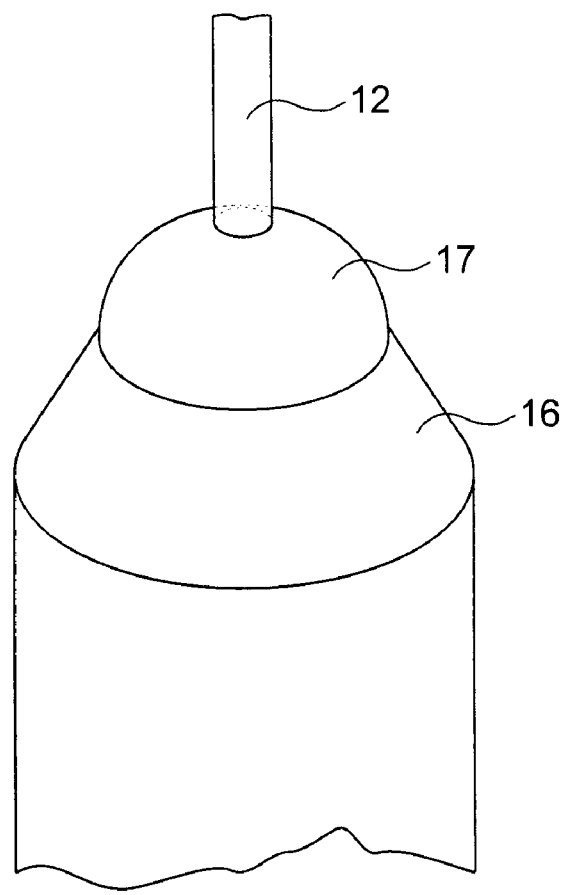
FIG. 4, already described, depicts a hermetic through-aperture for an optical fiber according to the prior art.
Figure 5:
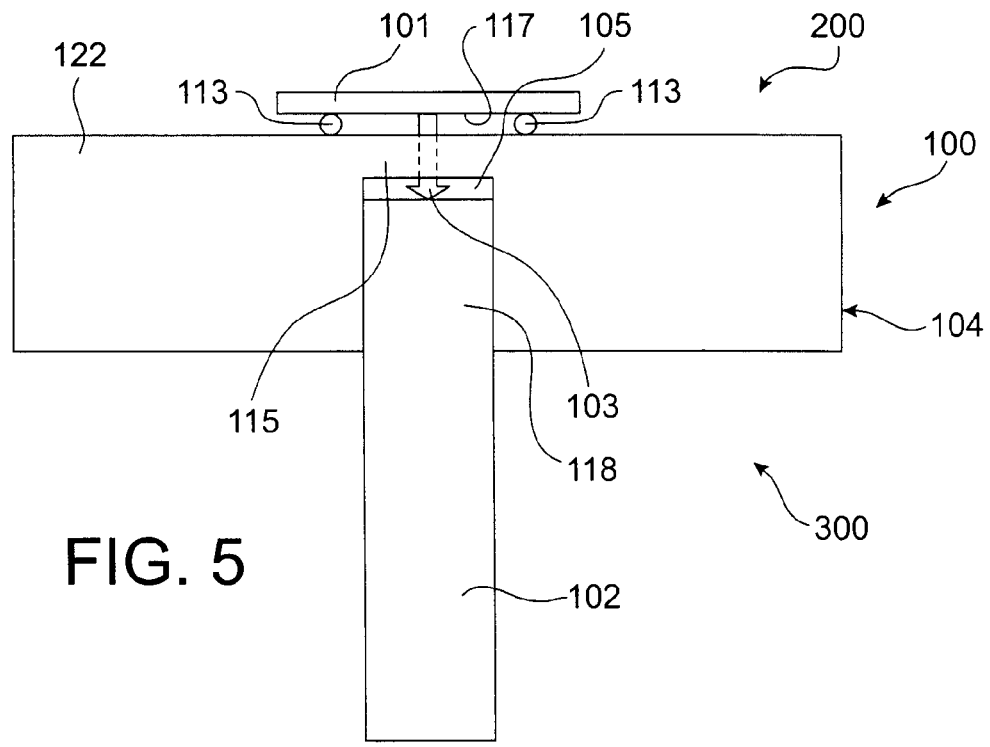
FIG. 5 is a diagram of a hermetic coupling device, an optoelectronic emitting and/or receiving device and an optoelectronic emitting and/or receiving system according to a first embodiment.

Reference is made firstly to FIG. 5 which shows a hermetic coupling device 100 according to a first embodiment. The hermetic coupling device 100 comprises a substrate 104 and is intended to form hermetic coupling between at least one optoelectronic component 101 intended to emit and/or receive at least one light beam 103, e.g. a laser beam or a beam derived from an electroluminescent diode, and also comprises optical transmission means 102 intended to convey this light beam 103. FIG. 5 also shows an optoelectronic emitting and/or receiving device 200 according to a first embodiment. This optoelectronic emitting and/or receiving device 200 comprises the hermetic coupling device 100 and also the optoelectronic component 101. Finally, FIG. 5 also shows an optoelectronic emitting and/or receiving system 300 according to a first embodiment. The optoelectronic emitting and/or receiving system 300 comprises the emitting and/or receiving device 200 and the optical transmission means 102.

The substrate 104, in this first embodiment, is a monolithic substrate. In FIG. 5, the substrate 104 is in a semiconductor-based material for example, such as silicon. The substrate 104 is provided with at least one blind hole 105 having a bottom wall 115 which is part of the substrate 104. This blind hole 105 does not therefore pass fully through the substrate 104. In FIG. 5, the blind hole 105 is of substantially cylindrical shape for example. It could also have a different shape, such as V-groove profile. The blind hole 105 can be obtained by dry etching for example such as DRIE (Deep Reactive Ion Etching), by wet etching or by laser machining or any other adapted technique. These etching techniques are described further on in the description. One part 118 of the optical transmission means 102, here one end 118 of an optical fiber 102, is intended to be inserted in the blind hole 105.

In FIG. 5, the optoelectronic component 101 is a laser emitter for example, here a VCSEL, which emits the light beam 103. The optoelectronic emitting and/or receiving device 200 in this case is therefore an optoelectronic emitter device. The VCSEL 101 can be joined to a face 122 of the substrate 104, opposite the blind hole 105, using microspheres 113. These microspheres 113 allow flip-chip hybridization of the VCSEL 101, and hence allow alignment of the VSCEL 101 with the optical fiber 102 to an accuracy of less than one micrometer. In addition to their mechanical and electrical connecting role, these microspheres 113 also have a thermal role since they permit dissipation of the heat arising from functioning of the VCSEL 101. Several dozen microspheres 113 are used to achieve this hybridization. These microspheres 113 are arranged substantially on the periphery of a face 117 of the VCSEL 101. In FIG. 5, only two microspheres 113 can be seen. These microspheres 113 are in a fusible material such as a gold- and tin-based alloy. It can also be considered to use as fusible material an alloy of tin and lead, or a pure or nearly pure metal that is tin- or indium-based. The VCSEL 101 could also be joined to the hermetic coupling device 100 using conventional brazing. The VCSEL 101 is arranged so as to emit the light beam 103 in the blind hole 105 so that the light beam 103 is able to be transmitted by the optical fiber 102. The light beam 103 must therefore pass through the bottom wall 115 of the blind hole 105, before entering the blind hole 105. To do so, the light beam 103 must therefore be emitted at a wavelength allowing it to pass through the bottom wall 115 of the substrate 104, and reciprocally the bottom wall 115 of the substrate 104 must be in a material through which the light beam 103 can pass, i.e. in a material at least partly transparent to the light beam 103.

The system, here an optoelectronic emitter 300, comprises the optoelectronic emitting device 200 and the optical fiber 102. The end 118 of the optical fiber 102 is inserted and secured in the blind hole 105. This securing is achieved naturally since the diameter of the blind hole 105 is slightly greater than the diameter of the optical fiber 102. Since this optoelectronic emitting system 300 does not apply any mechanical or heat stresses to the optical fiber 102, which is a polarization-maintaining fiber for example, no increase is observed in the coupling between the polarization states of the light beam 103 transmitted by the optical fiber 102.

This first embodiment of the hermetic coupling device 100, of the optoelectronic emitting and/or receiving device 200 and of the optoelectronic emitting and/or receiving system 300, truly allows passive coupling to be obtained between the optoelectronic component 101 and the optical transmission means 102, whilst guaranteeing the hermeticity of the throughway between these two elements on account of the fact that the hole 105 is a blind hole. The substrate 104 ensures guiding and securing of the optical transmission means 102 which is passively aligned with the optoelectronic component 101. With current precision machining techniques, such as DRIE etching, it is not possible, in a monolithic substrate 104 in semiconductor material, to obtain the bottom wall 115 of the blind hole 105 allowing optimal transmission of the light beam 103 between the optoelectronic component 101 and the optical transmission means 102. For example, with this first embodiment, the roughness of the bottom wall 115 of the blind hole 105 is approximately several dozen nanometers, which induces losses at this interface. Additionally, semiconductor materials such as silicon are partly transparent to the visible spectrum and near-infrared. and also there are losses at each silicon/air interface.

Figure 6:
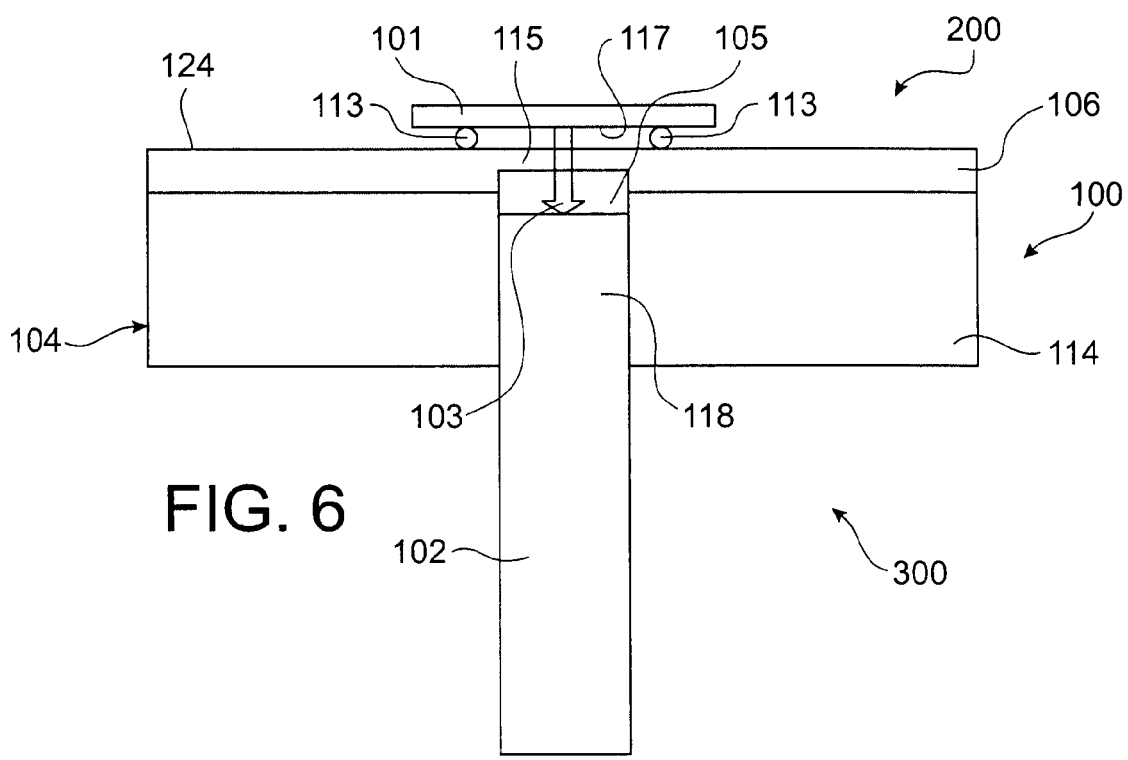
FIG. 6 is a diagram of an optoelectronic emitting and/or receiving system according to a second embodiment.

FIG. 6 illustrates the optoelectronic emitting system 300 in a second embodiment. Unlike the first embodiment, the hermetic coupling device 100 of this optoelectronic emitting system 300 comprises a substrate 104 formed of a stack of a first layer 114 and a second layer 106. In this second embodiment, the first layer 114 and the second layer 106 are in a semiconductor material for example, such as silicon. The thickness of the first layer 114 is approximately between 1 and 1.5 millimeters for example, and the blind hole 105 of substrate 104 passes fully through it. The thickness of the second layer 106 is around 500 micrometers. The second layer 106 here is partly crossed by the blind hole 105. The second layer 106 forms a bottom wall 115 of the blind hole 105. As in FIG. 5 the optoelectronic component, in this example a VCSEL 101, is joined to the substrate 104 and more precisely to a face 124 of the second layer 106, opposite the blind hole 105, using microspheres 113. The bottom wall 115 of the blind hole 105 is now part of the second layer 106.

As for the first embodiment, this second embodiment of the optoelectronic emitting and/or receiving system 300 achieves passive coupling between the VCSEL 101 and the optical fibre 102 whilst guaranteeing the hermeticity of the throughway between these two elements. The first layer 114 achieves guiding of the optical fiber 102 which is passively aligned with the VCSEL 101, and the hermetic seal between the optical fiber 102 and the VCSEL 101 is guaranteed by the second layer 106 which acts as hermetic optical window. But since the second layer 106 is in semiconductor material, this second embodiment has characteristics similar to those of the first embodiment, in particular the quality of the bottom wall 115 of the blind hole 105 and the transparency of the semiconductor material of the second layer 106, influencing the transmission quality of the light beam 103.

Figure 7:
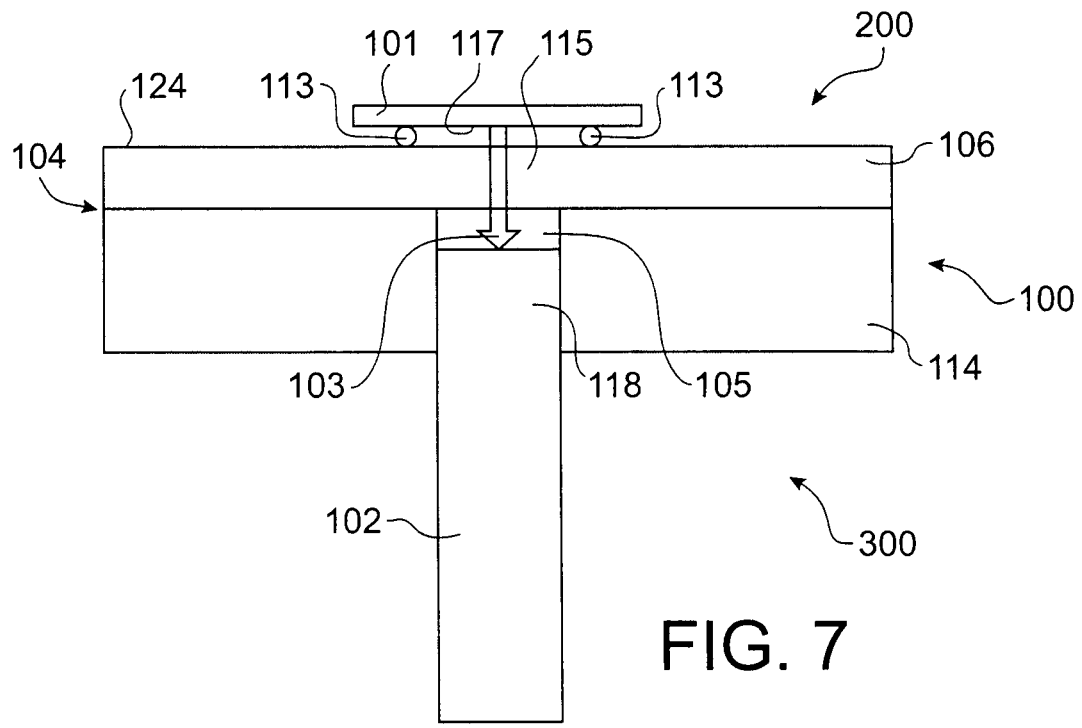
FIG. 7 is a diagram of an optoelectronic emitting and/or receiving system according to a third embodiment.

FIG. 7 illustrates the optoelectronic emitting system 300 according to a third embodiment. As in the second embodiment, the substrate 104 of the hermetic coupling device 100 of the optoelectronic emitting system 300 is formed of a stack of two layers 114, 106 but, unlike the second embodiment, the second layer 106 of the substrate 104 is in a transparent material, a glass material for example such as borosilicate glass. This second layer 106 could also be in a silicon material for example. Finally, in this third embodiment the blind hole 105 does not extend into the second layer 106, unlike the blind hole 105 in FIG. 6. As in FIG. 5 the optoelectronic component, in this example a VCSEL 101, is joined onto the substrate 104 and more precisely onto a face 124 of the second layer 106, opposite the blind hole 105, using microspheres 113 for example.

This third embodiment does not have the optical transmission disadvantages of the light beam 103 between the VCSEL 101 and the optical fiber 102 encountered in the two preceding embodiments, since the fact that the second layer 106 is glass- or silica-based means that it is possible to obtain a roughness of the bottom wall 115 of the blind hole 105 of a few nanometers. Also, the transparency characteristics related to the semiconductor of the substrate 104, encountered in the two first embodiments are improved since in the third embodiment, the second layer 106 is in a glass material.

Figure 8:
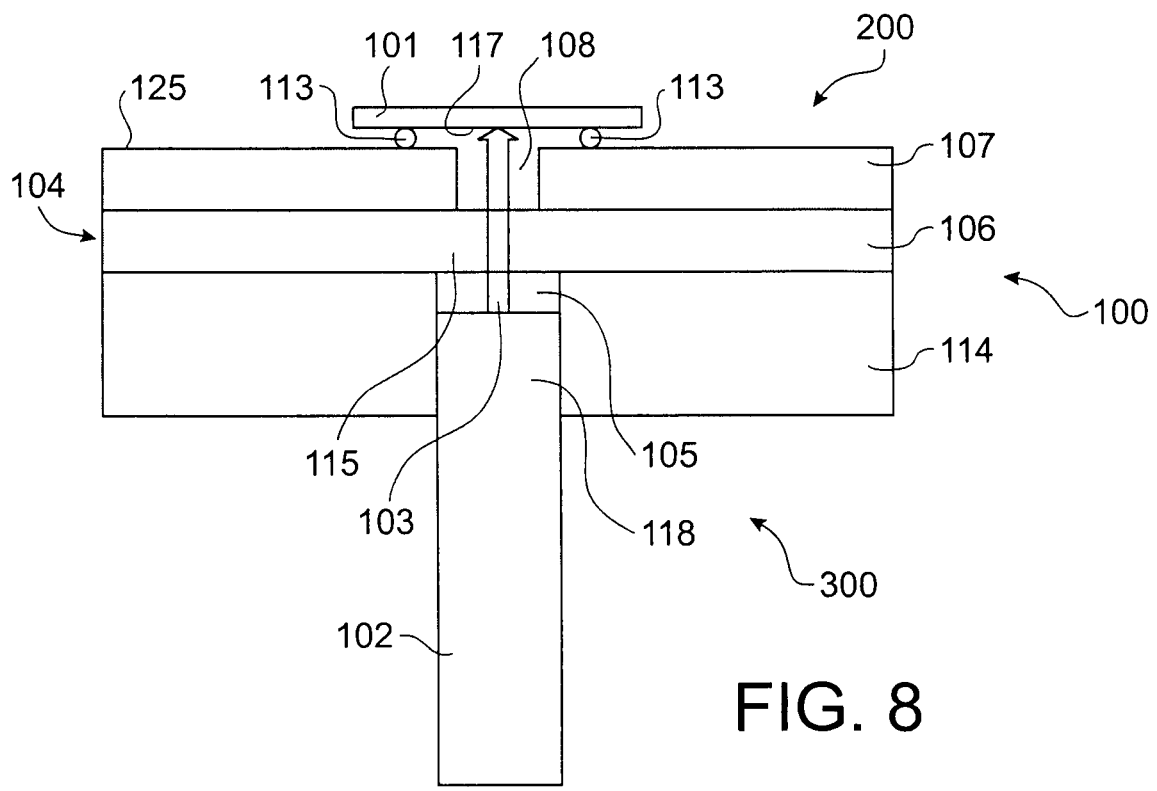
FIG. 8 is a diagram of an optoelectronic emitting and/or receiving system according to a fourth embodiment.

FIG. 8 shows an optoelectronic receiving system 300 according to a fourth embodiment. The substrate 104 of the hermetic coupling device 100 of the optoelectronic receiving system 300 in FIG. 8 is formed of a stack of a first layer 114, a second layer 106 and a third layer 107. The first layer 114 and the second layer 106 are substantially similar to those in FIG. 7. The third layer 107 is stacked on and joined to the second layer 106. The third layer 107 is a semiconductor material for example such as silicon, and its thickness is approximately 50 micrometers for example. The third layer 107 has a through hole 108, substantially aligned with the blind hole 105 of the substrate 104 and which passes through the first layer 114. In FIG. 8, the diameter of the hole 108 is slightly smaller for example than the diameter of the blind hole 105. The second layer 106 forms a bottom wall 115 common to the two holes 105, 108. Unlike the preceding embodiments, the optoelectronic component 101 here is a receiving element, e.g. a photodiode which is joined to a face 125 of the third layer 107, using microspheres 113 for example, opposite the blind hole 105.

This fourth embodiment of the optoelectronic emitting and/or receiving system 330 offers the same qualities of coupling and hermeticity as obtained with the third embodiment. In addition the third layer 107 in a semiconductor material, compared with the preceding embodiments, offers the possibility to add other electronic or optoelectronic components which require a semiconductor layer for hybridization and which could therefore not be hybridized for example on the second layer 106 in a glass or silica material in the third embodiment.

Figure 9A:
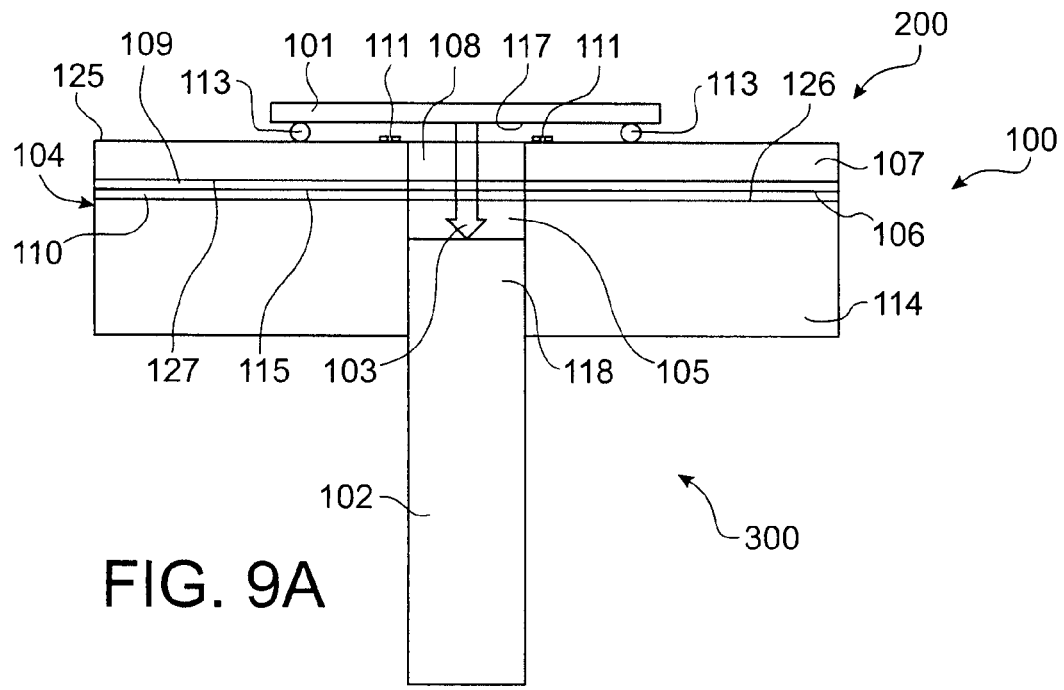
FIG. 9A is a diagram of an optoelectronic emitting and/or receiving system according to a fifth embodiment.
Figure 9B:
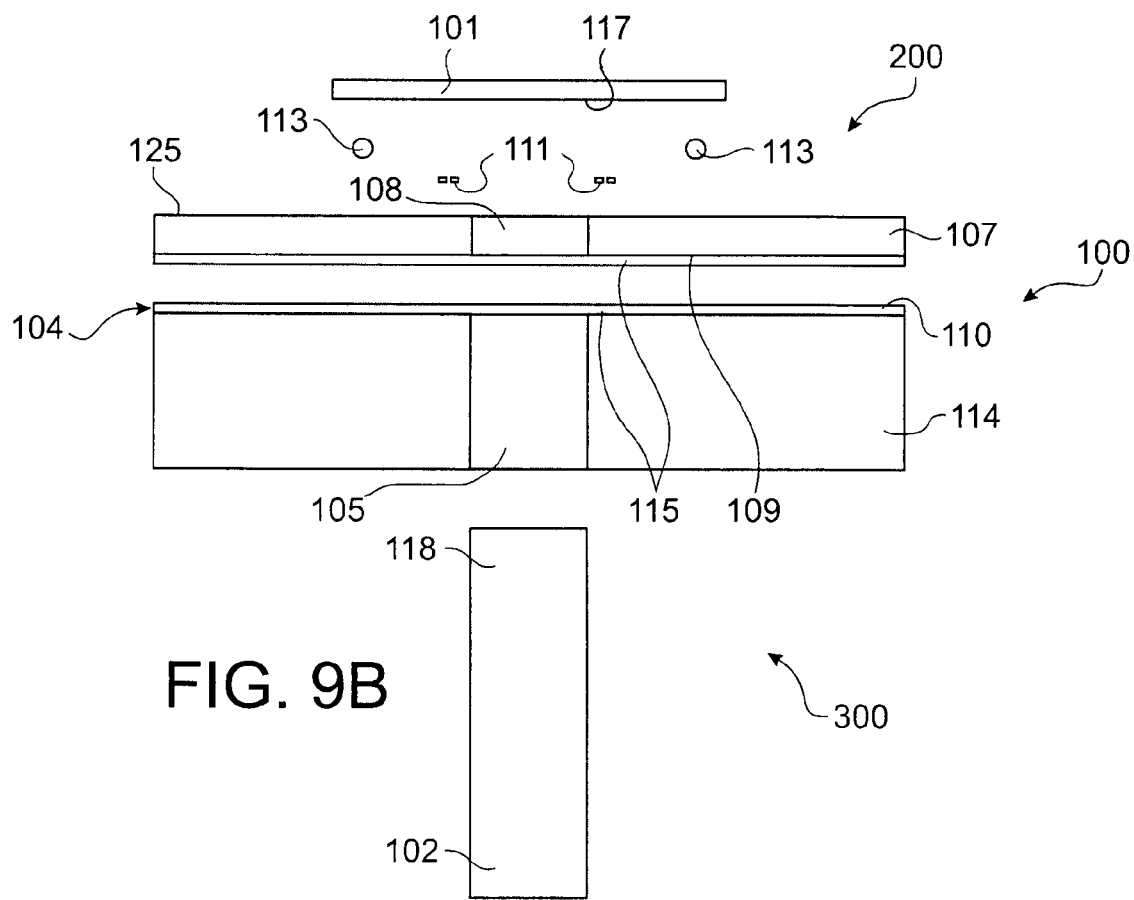
FIG. 9B is a diagram of the elements of an optoelectronic emitting and/or receiving system according to the fifth embodiment.

FIG. 9A shows the optoelectronic emitting system 300 according to a fifth embodiment. As in the fourth embodiment, the substrate 104 is formed of a stack of three layers. Unlike the fourth embodiment however the second layer 106 here is formed of a stack of at least two sub-layers 109, 110. These two sub-layers 109, 110 are in a silica material for example. The second layer 106 is obtained by stacking together and joining the first layer 114 with the third layer 107, each being coated on one of their faces 126 and 127 respectively with at least one of the silica sub-layers 110 and 109 respectively. The joining of the first layer 114 and the third layer 107 via the two sub-layers 109, 110, after assembly by molecular bonding, therefore forms the second layer 106. Each of the two sub-layers 109, 110 can for example have a thickness of between around 1 and 2 micrometers. The thickness of the second layer 106 here is therefore between 2 and 4 micrometers. The blind hole 105 of the substrate 104 and the through hole 108 are arranged substantially as in FIG. 8. Hole 108 in FIG. 9A has a diameter for example that is substantially similar to the diameter of the blind hole 105. The hermetic coupling device 100 of this fifth embodiment also comprises a photodetection system 111 integrated on one semiconductor face of the substrate 104, here on the surface of the third layer 107. In FIG. 9A, the photodetection system 111 is a photodetector of MSM type (Metal—Semiconductor—Metal) obtained by depositing conductor lines e.g. in aluminum on one face 125 of the third layer 107. This photodetector 111 is arranged substantially opposite the blind hole 105 of the substrate 104, substantially on the periphery of the hole 108 passing through the third layer 107. The photodetector 111 is arranged between an optoelectronic component—here a VCSEL 101 joined using microspheres 113 for example to a face 125 of the substrate 104—and the substrate 104. Therefore when the VCSEL 101 emits the light beam 103, the photodetector 111 can control the power of the light beam 103 without disturbing its emission.

This fifth embodiment of the optoelectronic emitting and/or receiving system 300 offers the same qualities of coupling and hermeticity as those obtained with the fourth embodiment, with in addition the function ensured by the photodetector 111 integrated on the surface of substrate 104. The fact that the second layer 106 is formed by two silica sub-layers 109, 110 offers substantially the same optical transmission qualities of the light beam 103 as a second monolithic layer in a glass material for example as in FIG. 8.

Figure 10:
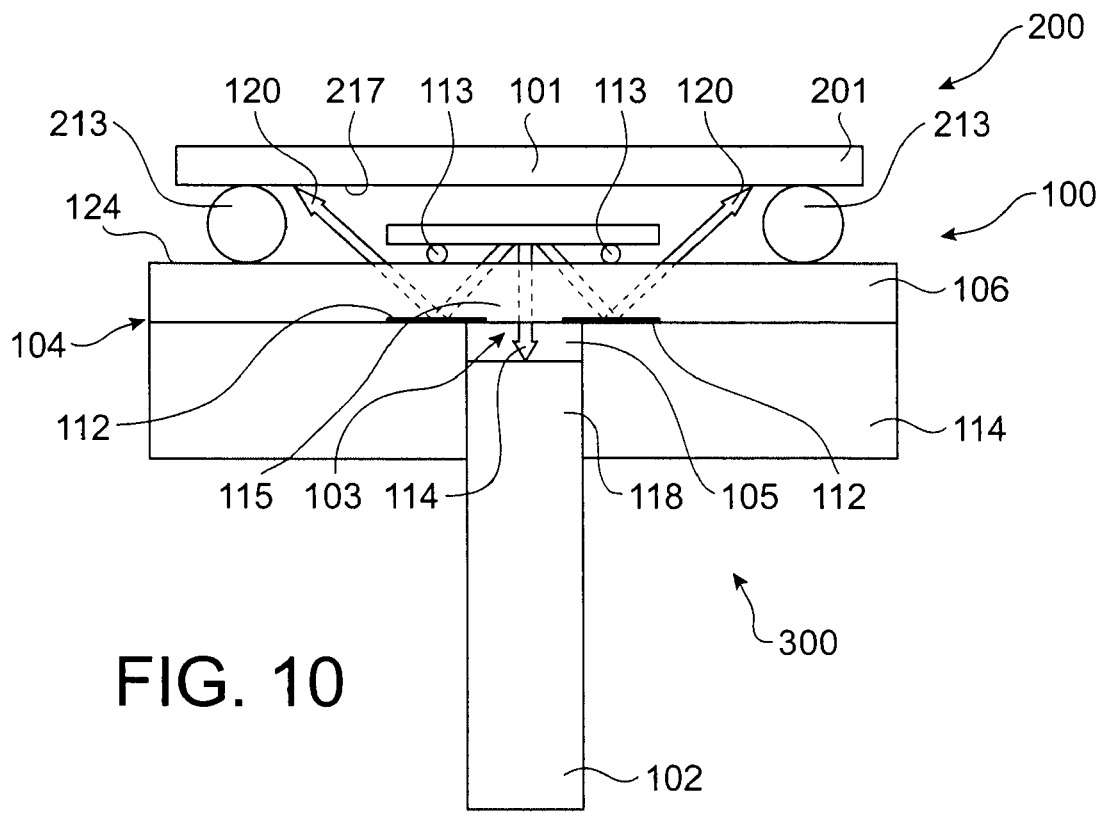
FIG. 10 is a diagram of an optoelectronic emitting and/or receiving system, subject of the present invention, according to a sixth embodiment.

FIG. 10 shows the optoelectronic emitting system 300, subject of the present invention, according to a sixth embodiment. The substrate 104 of the hermetic coupling device 100 of the optoelectronic emitting system 300 is substantially similar to the one in the third embodiment. Reflective patterns 112, e.g. in metal are inserted between two layers of the hermetic coupling device 100, here the first layer 114 and the second layer 106 of substrate 104. These reflective patterns 112 are arranged substantially on the periphery of the blind hole 105 of the substrate 104, thereby forming an annular mirror around the edge of the blind hole 105. The thickness of these reflective patterns 112 is for example between 500 nanometers and 1 micrometer. Their fabrication is detailed further on. The optoelectronic emitting system 300 comprises two optoelectronic components 101, 201. The first optoelectronic component 101 is a VCSEL for example arranged as in FIG. 7 and joined using microspheres 113 for example. The second optoelectronic component 201, e.g. a photodiode, is arranged substantially opposite the blind hole 105 so that the VCSEL 101 is arranged between the photodiode 201 and the substrate 104 of the hermetic coupling device 100. The photodiode 201 is hybridized on the face 124 of the second layers 106 using microspheres 213 whose diameter is for example greater than the diameter of microspheres 113. Several dozen microspheres 213 are used to achieve this hybridization. These microspheres 213 are arranged substantially on the periphery of a face 217 of the photodiode 201. In FIG. 10, only two microspheres 213 can be seen. These microspheres 213 are in a fusible material such as a gold- and tin-based alloy. It can also be considered to use as fusible material a tin and lead alloy, or a pure or nearly pure tin- or indium-based metal. Therefore, like the VCSEL 101, the photodiode 201 is aligned passively with the optical transmission means 102, to an accuracy substantially similar to the accuracy achieved for alignment of the VCSEL 101 with the optical transmission means 102. The diameter of the microspheres 213 determines the distance of the photodiode 201 from the hermetic coupling device 100.

During operation of the optoelectronic emitting system 300, the VCSEL 101 transmits the light beam 103. One part 114 of the light beam 103 passes through the second layer 106 and is then conveyed by the optical fiber 102. Another part 120 of the light beam 103 passes through the second layer 106, is reflected by the reflective patterns 112 and is returned in the direction of the photodiode 201. The photodiode 201 then receives part 120 of the light beam 103, allowing measurement of certain characteristics of the light beam 103, such as the emitting power of the VCSEL 101.

This sixth embodiment of the optoelectronic emitting and/or receiving system 300 offers the same coupling and hermeticity qualities as those obtained with the third embodiment with, in addition, the function ensured by the photodiode 201 and the reflective patterns 112. Therefore with this sixth embodiment it is possible to obtain a unique device allowing a light signal to be emitted whilst controlling this signal.

Figure 11A:
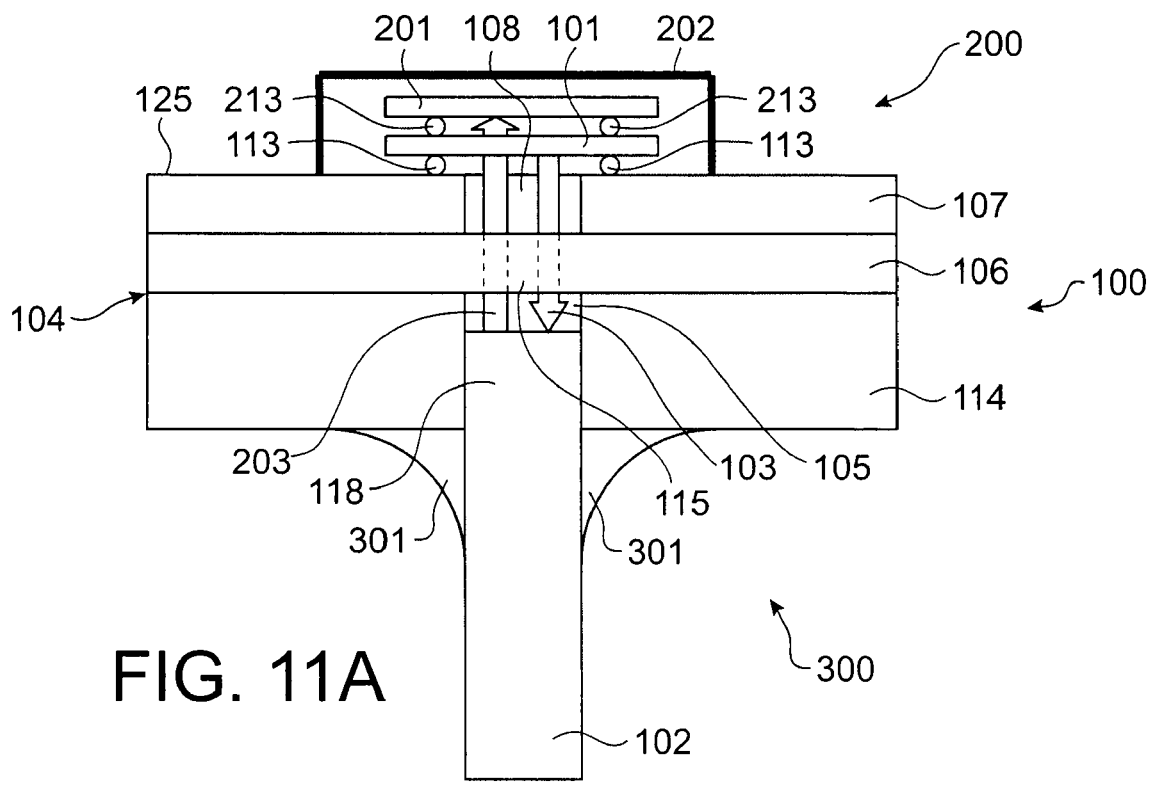
FIG. 11A is a diagram of an optoelectronic emitting and/or receiving system according to a seventh embodiment.
Figure 11B:
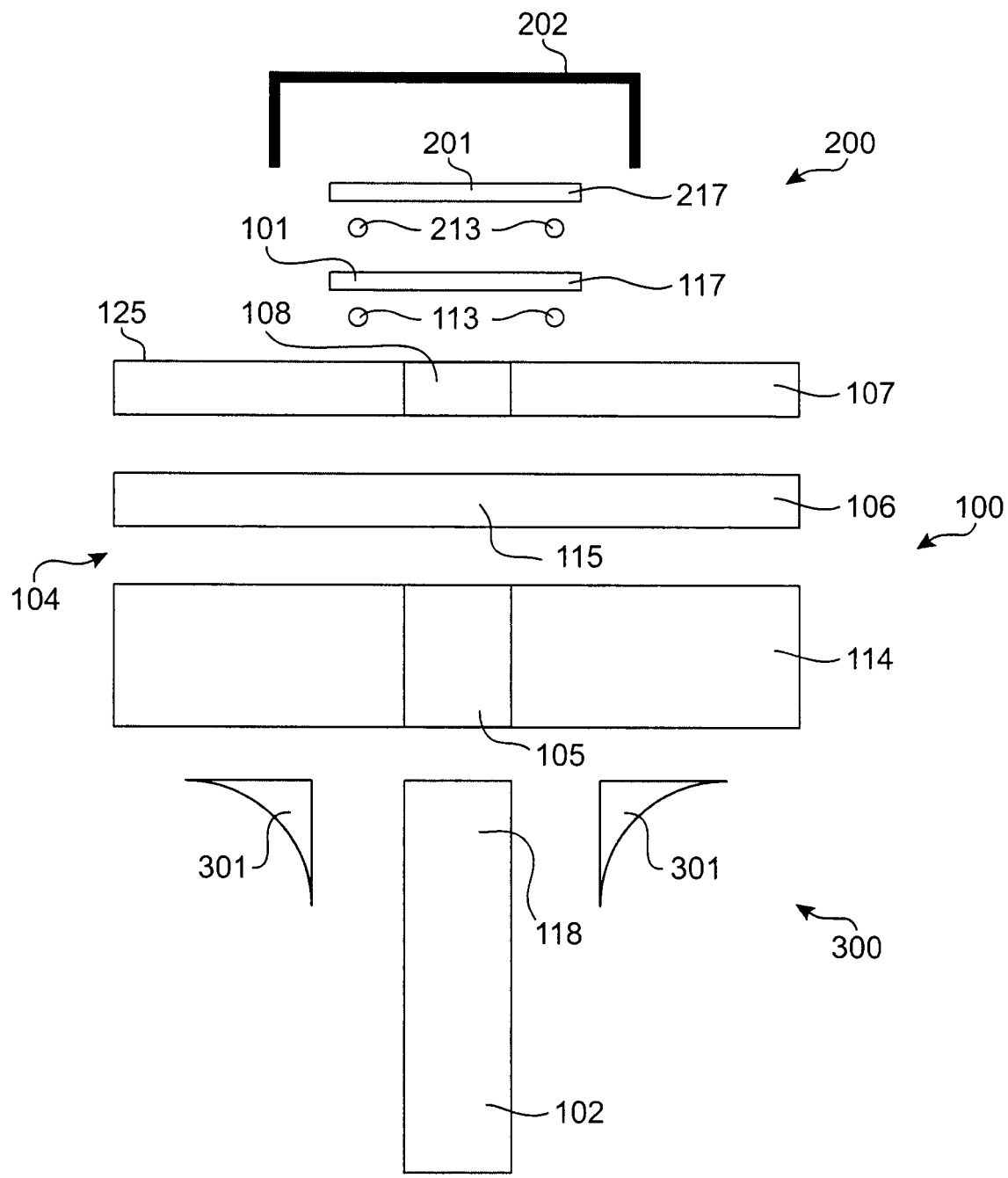
FIG. 11B is a diagram of the elements of an optoelectronic emitting and/or receiving system according to the seventh embodiment.

FIG. 11A illustrates an optoelectronic emitting and/or receiving system 300 according to a seventh embodiment. The substrate 104 in FIG. 11A is substantially similar to the one in FIG. 8. The optoelectronic emitting and receiving system 300 comprises two optoelectronic components 101, 201. The first optoelectronic component 101 is a VCSEL for example arranged as in FIG. 8. The second optoelectronic component 201 is a photodiode for example. The photodiode 201 is arranged substantially opposite the blind hole 105, above the VCSEL 101, so that the VCSEL 101 is arranged between the substrate 104 and the photodiode 201. The photodiode 201 is hybridized directly on the first component 101, for example using microspheres 213 substantially similar to microspheres 113 which cooperate with the VCSEL 101. Therefore the photodiode 201 is passively aligned with the optical transmission means 102, to a precision substantially similar to the alignment of the VCSEL 101 with the optical transmission means 102. The photodiode 201 is intended to receive a light beam 203 derived from the optical transmission means 102. The bottom wall 115 and the VCSEL 101 must therefore be transparent or near-transparent to the light beam 203 received by the photodiode 201. This transparency of the VCSEL 101 can be obtained for example by optimizing Bragg mirrors not shown in this figure, located on front and rear faces of the VCSEL 101. The optoelectronic emitting and/or receiving device 200 of the optoelectronic emitting and/or receiving system 300 may also comprise a hermetic cap 202 covering the optoelectronic components 101, 201 present on the substrate 104 and secured to the third layer 107 of the substrate 104. Therefore hermeticity is not only achieved by the hermetic coupling device 100 which guarantees a hermetic seal between components 101, 201 and the optical transmission means 102, but also by this hermetic cap 202. The optoelectronic components 101, 201 are therefore fully isolated from the outside environment. In FIG. 11A, the optical fiber 102 is maintained in the blind hole 105 and secured to the substrate 104 via a bead of glue 301. This bead of glue 301 only has a securing role for the optical fiber 102. The glue is an organic glue for example.

This seventh embodiment of the optoelectronic emitting and/or receiving system 300 offers the same coupling and hermeticity qualities as those obtained with the fourth embodiment. In this embodiment, full hermeticity is obtained for the optoelectronic components 101, 201 present on the substrate 104 through the use of the cap 202. Finally securing of the optical fiber 102 is reinforced through the use of the bead of glue 301.

Figure 12:
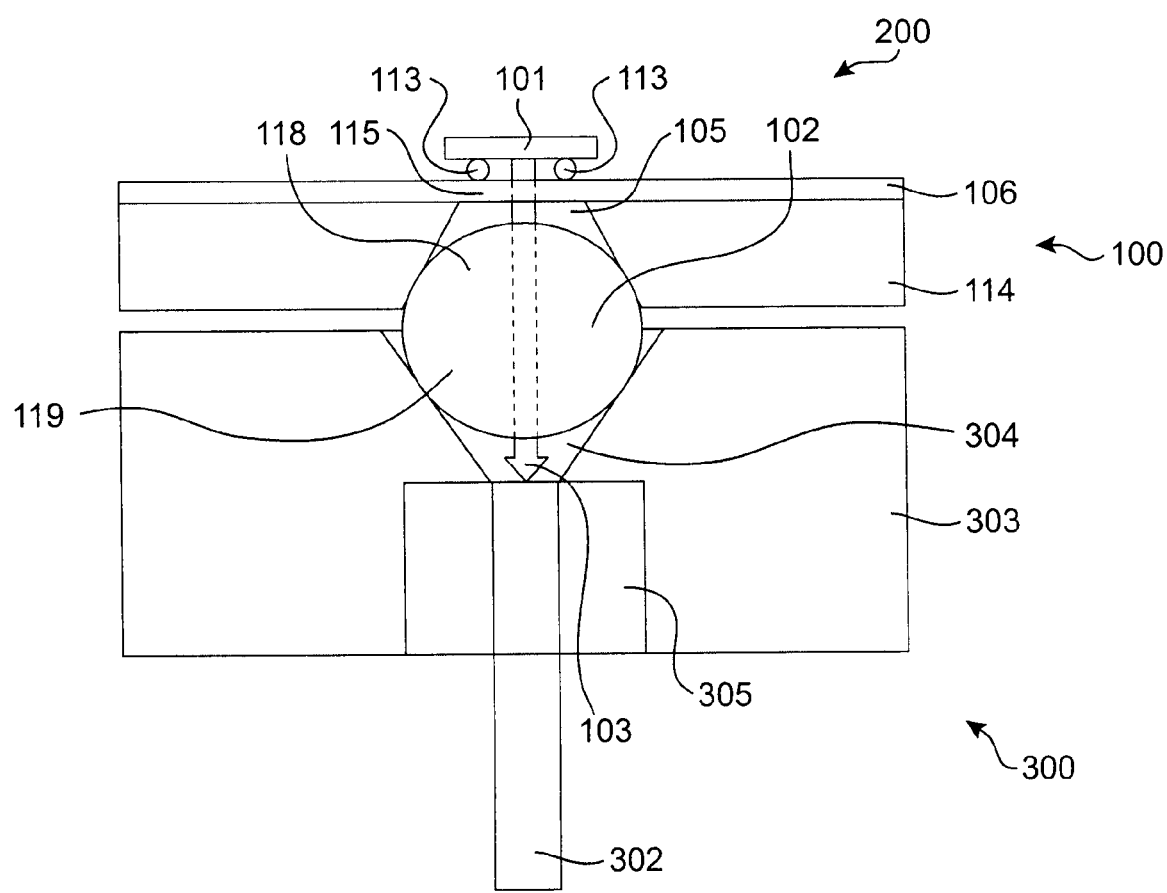
FIG. 12 is a diagram of an optoelectronic emitting and/or receiving system according to an eighth embodiment.

FIG. 12 shows the optoelectronic emitting system 300 according to an eighth embodiment. As in the third embodiment, the substrate 104 is formed of a stack of two layers 114, 106. Unlike the preceding embodiments, the blind hole 105 is a V-groove e.g. in the shape of a pyramid or truncated cone. As in FIG. 5 the optoelectronic component, in this example a VCSEL 101, is joined to the substrate 104 and more precisely to a face 124 of the second layer 106 opposite the blind hole 105, using microspheres 113 for example. The optical transmission means 102 here is a lens of substantially spherical shape. One part 118 of the lens 102 is inserted in the blind hole 105. The V profile of the blind hole 105 facilitates this insertion. The lens 102 is therefore passively and precisely aligned with the VCSEL 101. The precision of the techniques used, in particular to form the blind hole 105 with this V profile and to hybridize the microspheres 113 of the VCSEL 101, allows passive aligning of the lens 102 with the VCSEL 101 to an accuracy of approximately 1 to 2 micrometers. The lens 102 is also passively aligned with an optical fiber 302. This passive aligning is obtained using a connector 303. The connector 303, in molded polymer for example, comprises a hole 304 of substantially similar shape to that of the blind hole 105. One part 119 of the lens 102 is inserted in the hole 304 of the connector 303 which lies opposite the first layer 114 of the substrate 104. This optical fiber 302 is joined to the connector 303 via a ferrule 305. During the functioning of this optoelectronic emitting system 300, a light beam 103 emitted by the VCSEL 101, passes through the bottom wall 115 of the blind hole 105, then passes in the blind hole 105, passes through the lens 102, and finally arrives in the optical fiber 302. Typically with this embodiment it is possible to achieve passive alignment of the VCSEL 101 with the optical fiber 102 to a precision of less than approximately 5 micrometers. This embodiment also relaxes positioning constraints of the fiber 302 in the ferrule 305. Therefore the fiber 302 may be a polarization-maintaining fiber.

One method to fabricate a hermetic coupling device 100 between at least one optoelectronic component 101 and one optical transmission means 102, in a substrate 104 such as the one shown FIG. 5, may consist of etching to form a blind hole 105. For a monolithic substrate 104, like the one in FIG. 5, this step consists of performing a non-through etch in the substrate 104. This etching can be dry or wet etching for example.

Anisotropic wet etching in silicon is conventionally performed with solutions of potassium hydroxide (KOH) for example or tetramethylammonium hydroxide (TMAH). The concentration and temperature of the solution used for wet etching have an influence on etch rate and etch quality. These two parameters are maintained constant throughout etching using a hot water bath for example to prevent the solution from cooling, and by condensing vapors of the solution to maintain the initial concentration of the solution. Conventionally these solutions, having concentrations of between 20 and 25%, allow silicon etch rates to be obtained varying between approximately 0.5 and 1.5 micrometers per minute, at temperatures ranging from around 70 to 90° C. The masking material used for wet etching can be either silicon nitride $Si_3N_4$ for example or silica $SiO_2$. This masking material influences etch rate. For example, when using $SiO_2$ as masking material, combined either with a KOH solution or a TMAH solution, etch rates are faster with a KOH solution (a few nanometers per second) than with a TMAH solution (a few tenths of a nanometer per second). These solutions are conventionally used for volume machining of silicon which during etching develop crystallographic planes specific to silicon.

One dry etch method is DRIE etching for example, which can be used for anisotropic etching of silicon by dry route. This method combines a depositing method and plasma etching. As and when the silicon is machined, the method allows the depositing of a fluorinated compound on the machined walls for their passivation. Etch-deposit cycles using specific gasses and times must be heeded to obtain deep, anisotropic etching of the silicon irrespective of its orientation. The masks used can be resin, silica or a metal such as nickel, chromium or aluminum.

In the case of a substrate 104 formed of several layers, such as the one in FIG. 7, the blind hole 105 is formed by dry or wet etching, so that the blind hole 105 of the substrate 104 fully passes through a first layer 114 of the substrate 104. Etching may optionally be continued as far as a second layer 106 as shown FIG. 6. The second layer 106 in both cases forms a bottom wall 115 of the blind hole 105.

The method to fabricate the hermetic coupling device 100 may comprise an additional step consisting of stacking and joining at least one first layer 114 with at least one second layer 106, thereby forming a substrate 104 comprising at least two layers such as those shown FIGS. 6 to 12. This stacking and joining step of the first layer 114 with the second layer 106, illustrated passing from FIG. 11B to FIG. 11A, can be performed before or after the above-described etching step.

The joining of the first layer 114 with the second layer 106 can be made for example using a known method for direct bonding of two layers known as molecular bonding or wafer bonding. This technique consists of preparing the surfaces of two layers intended to be assembled together so that, as soon as these two surfaces are contacted, almost spontaneous bonding is achieved by molecular adhesion i.e. with no addition of any material. This preparation firstly requires planarizing the surfaces to be assembled. This planarization, for a layer of around 5 centimeters in diameter for example, gives planarity differences of less than 1 or 2 micrometers for the entire surface. Preparation also consists of polishing the surfaces to be assembled. This polishing can provide a roughness of less than a few nanometers. The near-spontaneous bonding is generally reinforced through the use of heat treatments e.g. at a temperature of over 300° C. Molecular bonding is obtained by hydrogen bonds which develop between an electropositive hydrogen atom and an electronegative atom such as oxygen or chlorine.

Joining of the first layer 114 and the second layer 106 can also be obtained by anodic bonding. This technique consists of preparing the surfaces of two layers intended to be assembled together, and of assembling them by applying pressure e.g. of around $10^{-3}$ Pa, an electric field e.g. around 2500 V created by electrodes, and heating to between around 300° C. and 500° C. The preparation of the surfaces to achieve anodic bonding is similar to the preparation for molecular bonding as described above. For bonding between a first layer 114 in silicon and a second layer 106 in glass, bonding is due to the formation of silica at the interface, with the oxygen ions of the glass diffusing in the silicon. Compared with molecular bonding, the stresses on the initial surface states are less severe. As a variant, bonding by the addition of a material can be used, for example using an epoxy glue.

The method to fabricate the hermetic coupling device 100 may comprise an additional step consisting of, on the first layer 114, forming reflective patterns 112 intended to be inserted between the first layer 114 and the second layer 106, before these two layers 114, 106 are joined. These reflective layers 112 may be arranged substantially on the periphery of the blind hole 105 of the substrate 104, as is illustrated in the hermetic coupling device 100 shown FIG. 10. FIGS. 13a to 13d illustrate several steps in the fabrication of these reflective patterns 112.

Figure 13A:
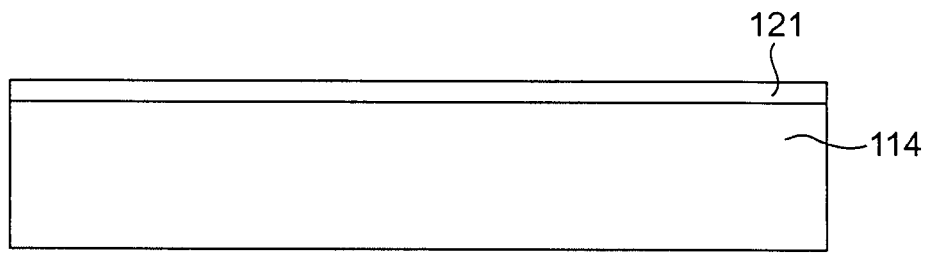
FIGS. 13a to 13d show the steps to fabricate reflective patterns of a hermetic coupling device, fabricated during a method to produce a hermetic coupling device subject of the present invention.
Figure 13B:
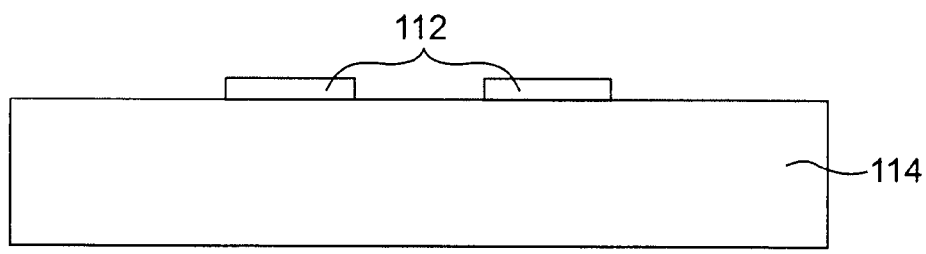
Figure 13C:
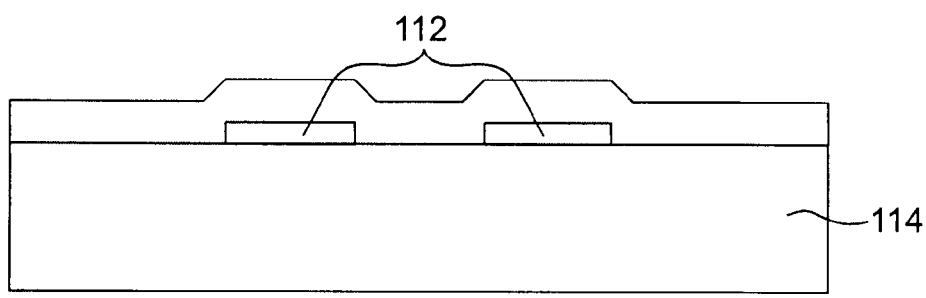
Figure 13D:
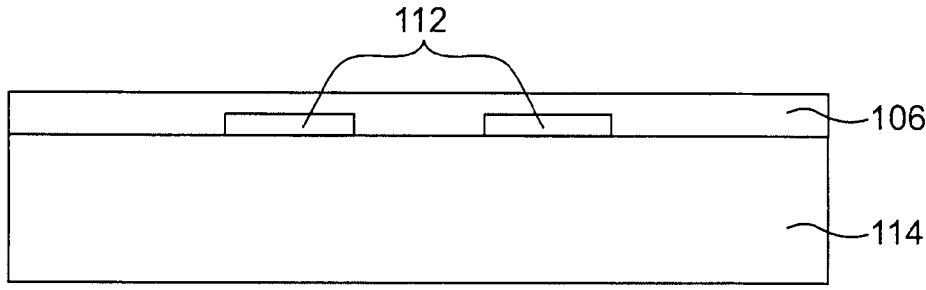

The step shown FIG. 13a illustrates the depositing of a metal layer 121, e.g. aluminum, on the first layer 114. This deposit may be made by vapor deposit or sputtering for example. During the step shown FIG. 13b, the metal layer 121 is structured so as to form reflective patterns 112. This structuring may be obtained by photolithography for example. At the step shown FIG. 13c, the second layer 106 is joined to the first layer 114 also covering the reflective patterns 112. At step 13d, the second layer 106 is planarized and polished as described above for joining by molecular bonding.

The method to fabricate the hermetic coupling device 100, before or after the stacking and joining step of the first layer 114 with the second layer 106, may comprise a stacking and joining step of a third layer 107 with the second layer 106. This step provides a substrate 104 formed of three layers such as the one illustrated in FIG. 8 or 11A for example. This third layer 107 is arranged so that the hole 108 is substantially aligned with the blind hole 105 of the substrate. The joining of the third layer 107 with the second layer 106 may be made by molecular bonding for example or anodic bonding. The first layer 107 may initially be a thick layer, typically around 500 micrometers thick, which is thinned after joining, by mechanical-chemical polishing for example and/or fracture at a weakened, buried area created by implanting gaseous species for example. This stacking and joining step of the third layer 107 with the second layer 106 is illustrated passing from FIG. 11B to FIG. 11A.

As a variant to the stacking and joining steps of a first layer 114 with a second layer 106, and of the second layer 106 with a third layer 107, the method to fabricate the hermetic coupling device 100, before of after the etch step of the blind hole 105 of substrate 104 in a first layer 114, may comprise a stacking and joining step of at least the first layer 114 with at least one third layer 107 through which a hole 108 fully passes, using at least two sub-layers 109, 110, each thereof carrying a face 126 and 127 that is to be joined to the first layer 114 and third layer 107. The stacking of these sub-layers 109, 110 forms a second layer 106 arranged between the first layer 114 and the third layer 107. These three layers 114, 106, 107 form a substrate 104 such as the one shown FIG. 9A. This stacking and joining step of the first layer 114 with the third layer 107 via the two sub-layers 109, 110, illustrated passing from FIG. 9B to FIG. 9A, can be achieved by molecular bonding for example or anodic bonding.

The method to fabricate a hermetic coupling device 100, before of after the stacking and joining step of the third layer 107 with the first layer 114 or second layer 106, may comprise an additional etching step, such as dry or wet etching, in the third layer 107 to obtain the hole 108 passing through the third layer 107 such as illustrated FIGS. 8, 9 and 11.

The method to fabricate a hermetic coupling device 100 may also comprise a step to integrate a photodetection system 111 on the surface of the third layer 107. This integration can be obtained by depositing conductor lines in aluminum for example on a semiconductor face of the substrate 104, here a face 125 of the third layer 107, thereby forming a photodetector 111 of MSM type. This integration step of the photodetection system 111 is illustrated passing from FIG. 9B to FIG. 9A.

One method to fabricate an optoelectronic emitting and/or receiving device 200 may consist of a step to join at least one optoelectronic component 101 to a substrate 104 of a hermetic coupling device 100 fabricated according to one of the above-described fabrication methods. FIGS. 5 to 12 show an optoelectronic emitting and/or receiving device 200 comprising an optoelectronic component 101 on a substrate 104 of the hermetic coupling device 100. The optoelectronic component 101 is arranged substantially opposite a blind hole 105 of the substrate 104. This joining step of the optoelectronic component 101 is illustrated passing from FIG. 9B to FIG. 9A.

This joining of the optoelectronic component 101 to the substrate 104 of the hermetic coupling device 100 can be performed in two steps: first a step to form microspheres 113, shown FIGS. 5 to 12, in a fusible material, on one face 117 of the optoelectronic component 101, this face 117 being intended to lie facing optical transmission means 102. For this purpose, metallized surfaces, not shown, are deposited and precision positioned by photolithography on the optoelectronic component 101 and on the substrate 104. The microspheres 113 are then deposited on the metallized surfaces of the optoelectronic component 101. The next step is to hybridize the optoelectronic component 101 on the substrate 104 using the microspheres 113. For this step pre-alignment is carried out between the optoelectronic component 101 and the substrate 104 by aligning the metallized surfaces of the optoelectronic component 101 with the metallized surfaces of the substrate 104. The microspheres 113 are then heated until the fusible material of the microspheres 113 melts. The microspheres 113 then wet the metallized surfaces of the optoelectronic component 101 and substrate 104 and, since the molten metal tends to minimize its surface, the optoelectronic component 101 aligns with the substrate 104. These steps to join the optoelectronic component 101 are illustrated passing from FIG. 9B to FIG. 9A.

The method to fabricate an optoelectronic emitting and/or receiving device 200, after the step to join the optoelectronic component 101 called the first optoelectronic component, may comprise a step to join at least one second optoelectronic component 201 to the substrate 104 of the hermetic coupling device 100, substantially opposite the blind hole 105 of the substrate 104. This joining is carried out so that the first optoelectronic component 101 is arranged between the substrate 104 and the second optoelectronic component 201. FIGS. 10 and 11A illustrate an optoelectronic emitting and/or receiving device 200 comprising a first and a second optoelectronic device 101, 201 joined to a substrate 104 of a hermetic coupling device 100. This joining of the second optoelectronic component 201 may be performed in two steps, similarly to the method for joining the first optoelectronic component 101, using microspheres 213 arranged on the periphery of a face 217 of the second optoelectronic component 201. This joining step of the second optoelectronic component 201 is illustrated passing from FIG. 11B to FIG. 11A.

The method to fabricate an optoelectronic emitting and/or receiving device 200, after the step to join the optoelectronic component(s) 101, 201, may comprise an additional step consisting of securing a hermetic cap 202 onto the substrate 104, such as illustrated FIG. 11A. This cap 202 can protect the component(s) 101, 201, against outside aggression thereby completing the hermeticity formed by the hermetic coupling device 100. This securing step of the hermetic cap 202 is illustrated passing from FIG. 11B to FIG. 11A.

Finally, a method to fabricate an optoelectronic emitting and/or receiving system 300 may consist of a step to insert one part 118 of an optical transmission means 102 in a blind hole 105 of an optoelectronic emitting and/or receiving device 200 fabricated according to any of the fabrication methods described above. FIGS. 5 to 12 show an optoelectronic emitting and/or receiving system 300 comprising one part 118 of an optical transmission means 102 inserted in a blind hole 105 of an optoelectronic emitting and/or receiving device 200. This insertion step is illustrated passing from FIG. 9B to FIG. 9A.

This method to obtain an optoelectronic emitting and/or receiving system 300, when the optical transmission means 102 is an optical fiber as shown FIG. 11A, and after the step to insert part 118 of the optical fiber 102 in the blind hole 105, may comprise a step to secure the optical fiber 102 to the emitting and/or receiving device 200 by a bead of glue 301. This securing step of the optical fiber 102 is illustrated passing from FIG. 11B to FIG. 11A.

Finally, this method to obtain an optoelectronic emitting and/or receiving system 300, if the optical transmission means 102 is a lens of substantially spherical shape, and after the step to insert the part 118 called first part of the lens 102 in the blind hole 105, may comprise a step to insert a second part 119 of the lens 102 in a housing 304 of a connector 303, facing an optical fiber 302 inserted in the connector 303, as illustrated FIG. 12.

Although several embodiments have been described in detailed manner, it will be appreciated that different changes and modifications may be made thereto without departing from the scope of the invention.

The invention claimed is:

1. A hermetic coupling device between at least one optoelectronic component, which is to emit and/or receive at least one light beam, and an optical transmission means which is to convey the light beam, comprising:

a substrate including at least one blind hole, having a bottom wall, in which one part of the optical transmission means is to be inserted, the substrate formed of a stack of at least one first layer and of at least one second layer to be arranged between the first layer and the optoelectronic component, the first layer having the blind hole of the substrate passing fully through it, and the second layer forming the bottom wall of the blind hole of the substrate, the light beam having to cross the substrate passing through the bottom wall of the blind hole, the substrate configured to receive the optoelectronic component substantially opposite the blind hole, and comprising reflective patterns inserted between two layers of the hermetic coupling device, that are arranged substantially on the periphery of the blind hole and configured to reflect one part of the light beam emitted by the optoelectronic component.

2. A hermetic coupling device according to claim 1, the substrate being in a semiconductor-based material, or silicon.

3. A hermetic coupling device according to claim 1, further comprising a photodetection system integrated on a semiconductor surface of the substrate, arranged substantially opposite the blind hole.

4. A hermetic coupling device according to claim 3, the photodetection system being at least one photodetector of MSM type.

5. A hermetic coupling device according to claim 1, the second layer having the blind hole partly passing through it.

6. A hermetic coupling device according to claim 1, the second layer being in a semiconductor-based material or silicon.

7. A hermetic coupling device according to claim 1, the second layer being in a glass- or silica-based material.

8. A hermetic coupling device according to claim 1, the second layer being formed of a stack of at least two sublayers.

9. A hermetic coupling device according to claim 1, further comprising at least one third layer having at least one hole passing fully through it that is substantially aligned with the blind hole, the second layer arranged between the first layer and the third layer.

10. A hermetic coupling device according to claim 9, the third layer being in a semiconductor-based material, or silicon.

11. An optoelectronic emitting and/or receiving device comprising:
    at least one first optoelectronic emitting and/or receiving component and a hermetic coupling device, according to claim 1, the first optoelectronic component being joined to the hermetic coupling device and arranged substantially opposite the blind hole of the hermetic coupling device.

12. An optoelectronic emitting and/or receiving device according to claim 11, the optoelectronic component being a light emitter, a VCSEL, a photodetector, or a photodiode.

13. An optoelectronic emitting and/or receiving device according to claim 11, further comprising at least one second optoelectronic component, joined to the hermetic coupling device and arranged substantially opposite the blind hole, the first optoelectronic component being arranged between the hermetic coupling device and the second optoelectronic component.

14. An optoelectronic emitting and/or receiving device according to claim 13, in which the first optoelectronic component is a laser emitter, the second optoelectronic component is a photodetector or a photodiode, or the first optoelectronic component is a photodetector, and the second optoelectronic component is a laser emitter or a VCSEL.

15. An optoelectronic emitting and/or receiving device according to claim 13, the first optoelectronic component being transparent or near-transparent to at least one light beam emitted and/or received by the second optoelectronic component, the light beam to cross through the first optoelectronic component and the hermetic coupling device by passing through the bottom wall of the blind hole and to be conveyed by the optical transmission means.

16. An optoelectronic emitting and/or receiving device according to claim 13, the second optoelectronic component being joined to the hermetic coupling device directly or via the first optoelectronic component.

17. An optoelectronic emitting and/or receiving device according to claim 11, the first optoelectronic component being joined onto the hermetic coupling device achieved via a connection using microspheres.

18. An optoelectronic emitting and/or receiving device according to claim 17, the microspheres being in a fusible material, a gold- and tin-based alloy, tin- and lead-based alloy, or a pure or nearly pure tin- or indium-based metal.

19. An optoelectronic emitting and/or receiving device according to claim 11, further comprising a hermetic cap covering the optoelectronic component or components and joined to the hermetic coupling device.

20. An optoelectronic emitting and/or receiving system comprising:
    at least one optical transmission means and an optoelectronic emitting and/or receiving device according to claim 11, the optical transmission means having one part inserted in the blind hole of the hermetic coupling device of the optoelectronic emitting and/or receiving device.

21. An optoelectronic emitting and/or receiving system according to claim 20, the optical transmission means comprising an optical fiber.

22. An optoelectronic emitting and/or receiving system according to claim 21, the optical fiber being secured to the optoelectronic emitting and/or receiving device by a bead of glue.

23. An optoelectronic emitting and/or receiving system according to claim 20, the optical transmission means comprising a lens to be passively aligned with an optical fiber inserted in a connector, a first part of the lens being inserted in the blind hole of the hermetic coupling device of the optoelectronic emitting and/or receiving device, and a second part of the lens to be inserted in a housing of the connector, facing the optical fiber.

24. An optoelectronic emitting and/or receiving system according to claim 23, the lens being of substantially spherical shape.

25. An optoelectronic emitting and/or receiving system according to claim 21, the optical fiber being a polarization-maintaining fiber.

* * * * *